(12) United States Patent
Gonsalves

(10) Patent No.: US 8,897,179 B2
(45) Date of Patent: Nov. 25, 2014

(54) METHOD AND APPARATUS FOR DETECTING AN OFFLINE RADIO RESOURCE IN AN INTEROPERABILITY SYSTEM

(75) Inventor: Mark Conrad Gonsalves, Morris, IL (US)

(73) Assignee: Cisco Technology, Inc., San Jose, CA (US)

( * ) Notice: Subject to any disclaimer, the term of this patent is extended or adjusted under 35 U.S.C. 154(b) by 914 days.

(21) Appl. No.: 12/871,022

(22) Filed: Aug. 30, 2010

(65) Prior Publication Data

US 2012/0051230 A1  Mar. 1, 2012

(51) Int. Cl.
*H04B 7/005* (2006.01)
*H04W 24/00* (2009.01)
*H04W 28/04* (2009.01)
*H04W 72/00* (2009.01)
*H04W 8/22* (2009.01)

(52) U.S. Cl.
CPC .............. *H04W 24/00* (2013.01); *H04W 28/04* (2013.01); *H04W 72/00* (2013.01); *H04W 8/22* (2013.01)

USPC .......................................................... 370/278

(58) Field of Classification Search
None
See application file for complete search history.

(56) References Cited

U.S. PATENT DOCUMENTS

| 2005/0233752 | A1* | 10/2005 | Laroia et al. ................. 455/450 |
| 2007/0064630 | A1* | 3/2007 | Olivier et al. ................. 370/278 |
| 2007/0184814 | A1 | 8/2007 | Hamilton |
| 2007/0249334 | A1 | 10/2007 | Oswal et al. |
| 2009/0168685 | A1* | 7/2009 | Olivier et al. ................. 370/312 |

* cited by examiner

*Primary Examiner* — Andrew Lai
*Assistant Examiner* — Leon Andrews
(74) *Attorney, Agent, or Firm* — P. Su

(57) ABSTRACT

In one embodiment, a method includes obtaining an indication that indicates that a donor radio is online with respect to an interoperability system, and determining if the indication is accurate. If the indication is not accurate, the method includes identifying a communication status for the donor radio within the interoperability system as a fail. Alternatively, if the indication is accurate, the communication status for the donor radio is identified within the interoperability system as being a success.

12 Claims, 6 Drawing Sheets

METHOD AND APPARATUS FOR DETECTING AN OFFLINE RADIO RESOURCE IN AN INTEROPERABILITY SYSTEM

BACKGROUND

The disclosure relates generally to interoperability and collaboration systems and, more generally, to efficiently identifying resources within an interoperability and collaboration system that is not operating as expected.

In an interoperability system, e.g., a voice interoperability system such as an Internet Protocol (IP) Interoperability and Collaboration System (IPICS) system, donor radios are often used to bridge radio communications between the interoperability system and a system that is associated with the donor radio. When the donor radio is successfully receiving and transmitting information, communications between the interoperability system and the system associated with the donor radio may occur efficiently. However, when the donor radio is not successfully receiving and/or transmitting information, communications may be disrupted. When communications are disrupted because a donor radio is not functioning as expected, messages are not successfully relayed, which may lead to inconvenience and, in some instances, serious consequences.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
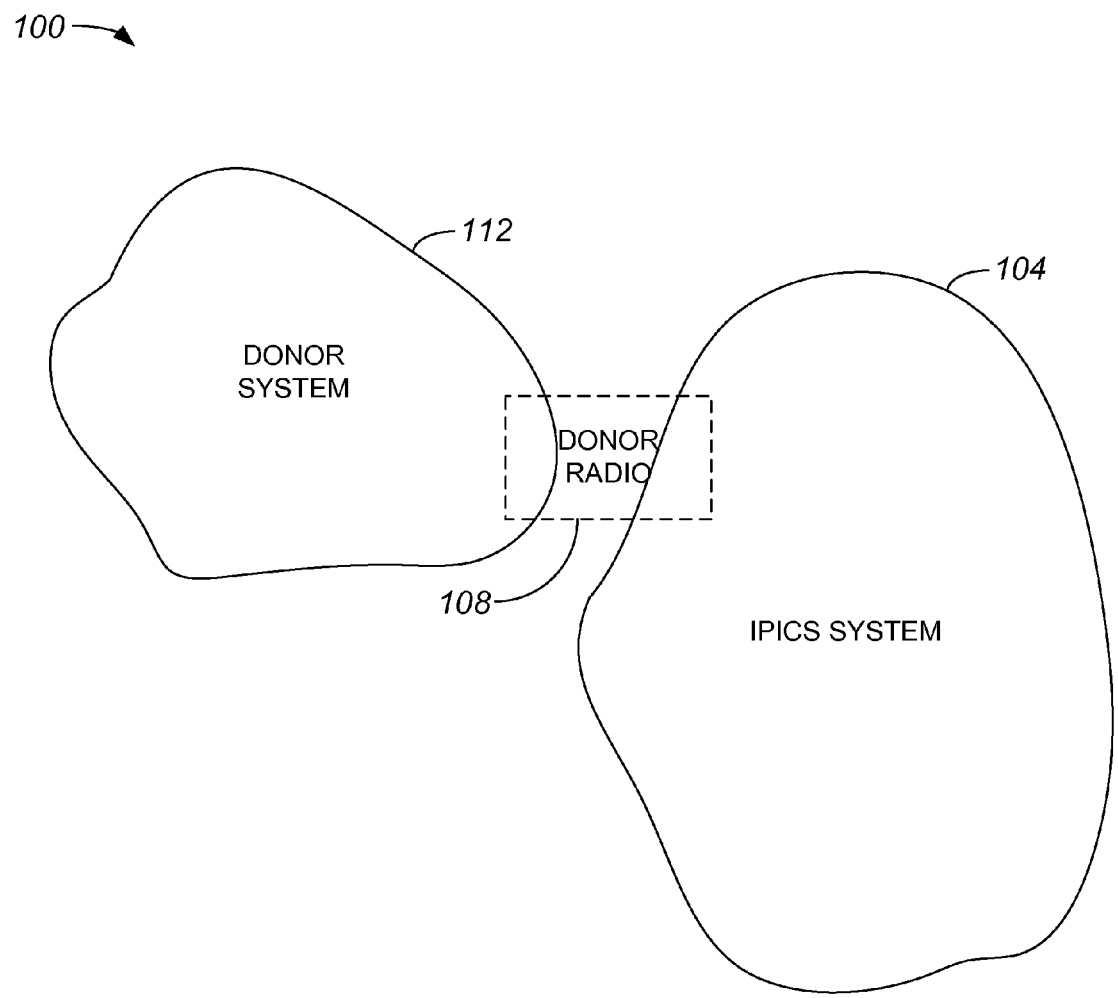
FIG. 1 is a diagrammatic representation of an overall system in which a donor radio associated with a donor system is arranged to bridge communications between an Internet Protocol (IP) Interoperability and Collaboration System (IPICS) system and the donor system.

According to one aspect, a method includes obtaining an indication that indicates that a donor radio is online with respect to an interoperability system, and determining if the indication is accurate. If the indication is not accurate, the method includes identifying a communication status for the donor radio within the interoperability system as a fail. Alternatively, if the indication is accurate, the communication status for the donor radio is identified within the interoperability system as being a success.

Description

A donor or proxy radio associated with a donor system, e.g., donor network, is used to bridge radio communications between an interoperability system e.g., a voice interoperability system such as an Internet Protocol (IP) Interoperability and Collaboration System (IPICS) system, and the donor system. When the donor radio is not operating as expected, as for example when a receive and transmit connection, e.g., an ear and mouth (E&M) connection, between the donor radio and the IPICS system is not functioning, communications between the donor system and the IPICS system may be disrupted. The donor system may send messages that are not received by the IPICS system, and the IPICS system may send messages that are not received by the donor system. Communications breakdowns may be inconvenient and, in a situation in communications are critical, may lead to severe consequences. For example, in a public safety environment, the ability to immediately identify communications breakdowns is essential.

In one embodiment, an IPICS system may detect when a donor radio that is expected to be online is essentially not online. That is, an IPICS system is arranged to substantially automatically determine whether a donor radio that is expected to be transmitting and/or receiving does not appear to be transmitting and/or receiving. By way of example, a radio control server (RCS) of an IPICS system may determine when a donor radio is properly interoperating with respect to the IPICS system by ascertaining whether the donor radio is transmitting packets to the RCS and/or receiving packets from the RCS. If the RCS determines that the donor radio is not properly interoperating with respect to the IPICS system, then the RCS may cause an administrator of the IPICS system to be notified.

To determine whether a donor radio is successfully interoperating with respect to an IPICS system, the IPICS system may effectively monitor communications associated with the donor radio. An IPICS system, e.g., an RCS of an IPICS system, may determine whether a donor radio has notified the IPICS system that the donor radio is successfully receiving and/or, as the case may be, transmitting. The IPICS system may also monitor real-time transport protocol (RTP) packets on a multicast group associated with a donor radio to determine whether the donor radio is successfully receiving. By way of example, if a donor radio indicates that it is receiving, but RTP packets are not detected on a multicast group associated with the donor radio, a flag may effectively be raised. Such a flag may prompt a network administrator to determine the cause of the apparent loss of communication.

It should be appreciated that an IPICS system may also effectively monitor communications associated with a donor radio to ascertain whether the donor radio is transmitting. In one embodiment, to detect whether a donor radio is successfully transmitting, an IPICS system, e,g., an RCS of an IPICS system, detects whether there are RTP packets associated with a particular multicast group or address. If a donor radio does not indicate that it is transmitting, but RTP packets are detected, a flag may effectively be raised.

By allowing an IPICS system to verify that a donor radio is functioning as expected, potential problems with the donor radio may be substantially automatically identified. For example, a problem with the connectivity of the donor radio such as a disconnected E&M port may be identified, or a problem with the configuration of the donor radio may be identified.

Referring initially to FIG. 1, an overall system in which a donor radio associated with a donor system is arranged to bridge communications between an IPICS system and the donor system will be described. An overall system 100, which may be an overall communications network, includes an IPICS system 104 and a donor system 112. In general, donor system 112 may be a radio network, although it should be appreciated that donor system 112 is not limited to being a radio network.

Donor system 112 includes a donor radio 108, or is otherwise associated with donor radio 108. As shown, donor radio 108 is also associated with IPICS system 104. Donor radio 108 is generally a device that is configured to bridge communications between donor system 112 and IPICS system 104. That is, through donor radio 108, donor system 112 and IPICS system 104 may communicate. Donor radio 108 provides communications obtained from IPICS system 104 to donor system 112, and provides communications obtained from donor system 112 to IPICS system 104.

Figure 2:
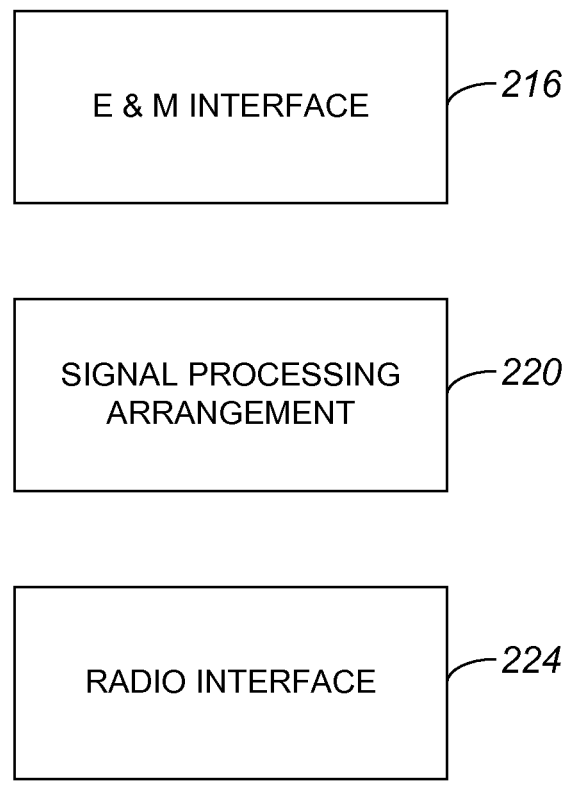
FIG. 2 is a block diagram representation of a donor radio.

FIG. 2 is a block diagram representation of one embodiment of a donor or proxy radio. A donor radio 208 may generally be any radio device which may operate to bridge communications between a donor system and an IPICS system. In one embodiment, donor radio 208 may be a push-to-talk (PTT) radio device Donor radio 208 includes an E&M interface 216, a signal processing arrangement 220, and a radio interface 224. E&M interface 216 may generally be an E&M connection or an E&M trunk. E&M interface 216 is typically associated with a trunking circuit and a signaling circuit. For example, E&M interface 216 may generally be a representation of voice interoperability, and may be, but is not limited to being, a land mobile radio gateway that is capable of converting between speaker/microphone audio and VoIP. Signal processing arrangement 220 is arranged to process signals received by and/or sent by donor radio 208. For example, signal processing arrangement 220 may convert audio signals to voice over IP (VoIP) signals, and vice versa. Radio interface 224 is configured to transmit and/or receive signals across radio frequencies.

Figure 3:
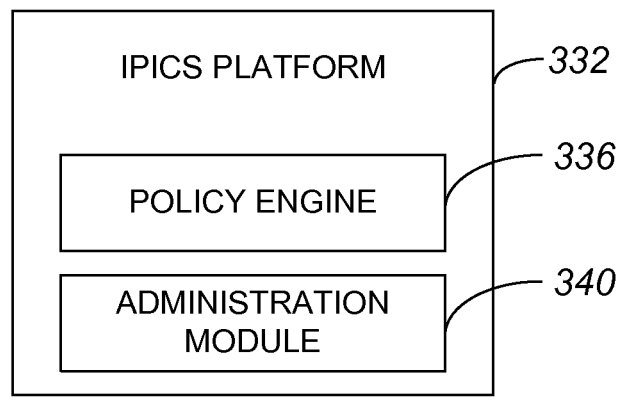
FIG. 3 is a block diagram representation of an IPICS system that is arranged to detect an offline donor radio in accordance with an embodiment.
Figure 3:
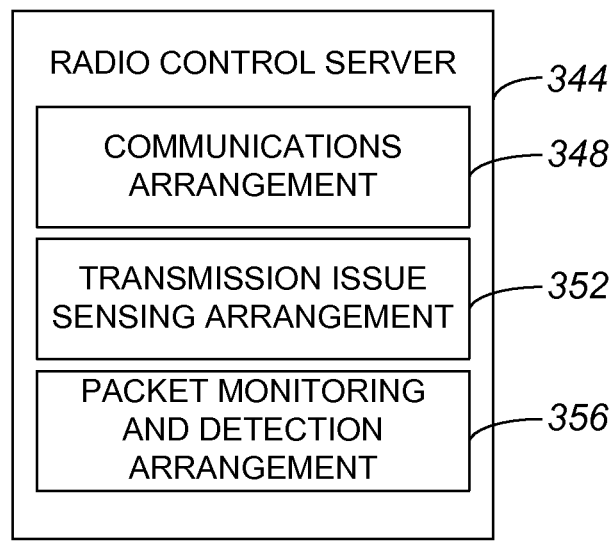

With reference to FIG. 3, and IPICS system that is arranged to detect an offline donor radio will be described in accordance with an embodiment. An IPICS system 304 generally includes an IPICS platform 332 and a radio control server 344. IPICS platform 332 includes a policy engine 336 and an administration module 340. Radio control server 344 includes a communications arrangement 348, a transmission issue sensing arrangement 352, and a packet monitoring an detection arrangement 356.

Policy engine 336 generally includes policies relating to IPICS system 304. In one embodiment, policy engine 336 includes policies associated with the operation of radio control server 344. Policy engine 366 may also include policies which specify what to do in the event that a donor radio (not shown) is offline when the donor radio is expected to be online, e.g., policies which specify how to find another radio resource to use when the donor radio is effectively unavailable. Administration module 340 is arranged to enable communications within IPICS system 304 to be managed, as for example across devices, technologies, and locations.

Radio control server 344 may be arranged to operate as a land mobile radio (LMR) gateway that obtains, e.g., receives, an audio signal from a donor radio (not shown) on communications arrangement 348. Communications arrangement 348 may be arranged to communicate, e.g., communicate with IPICS platform 332 and a donor radio (not shown), using radio frequencies. Communications arrangement 348 may generally be arranged to communicate using any suitable communications channels, such as those used to facilitate IP communications. In one embodiment, communications arrangement 348 may be configured to configure donor radios to appropriately communicate with radio control server 344.

Transmission issue sensing arrangement 352 may be a module, e.g., a module that includes software and/or hardware logic, that is configured to essentially determine whether a donor radio (not shown) is working properly, or otherwise functioning as expected. Transmission issue sensing arrangement 352 is arranged, in one embodiment, to assess whether a donor radio (not shown) that is expected to be transmitting is actually transmitting, and/or whether a donor radio that is expected to be receiving is actually receiving.

Packet monitoring and detection arrangement 356 may monitor communications between radio control server 344 and a donor radio (not shown). Monitoring communications may include, but is not limited to including, monitoring a multicast group associated with a donor radio (not shown) to determine if packets are being sent and received through the multicast group. Packet monitoring and detection arrangement 356 may identify if packets, as for example real-time transport protocol (RTP) packets, substantially match a synchronization source (SSRC) of packets associated with a donor radio (not shown), and provide a notification to IPICS platform 332 as appropriate.

Figure 4:
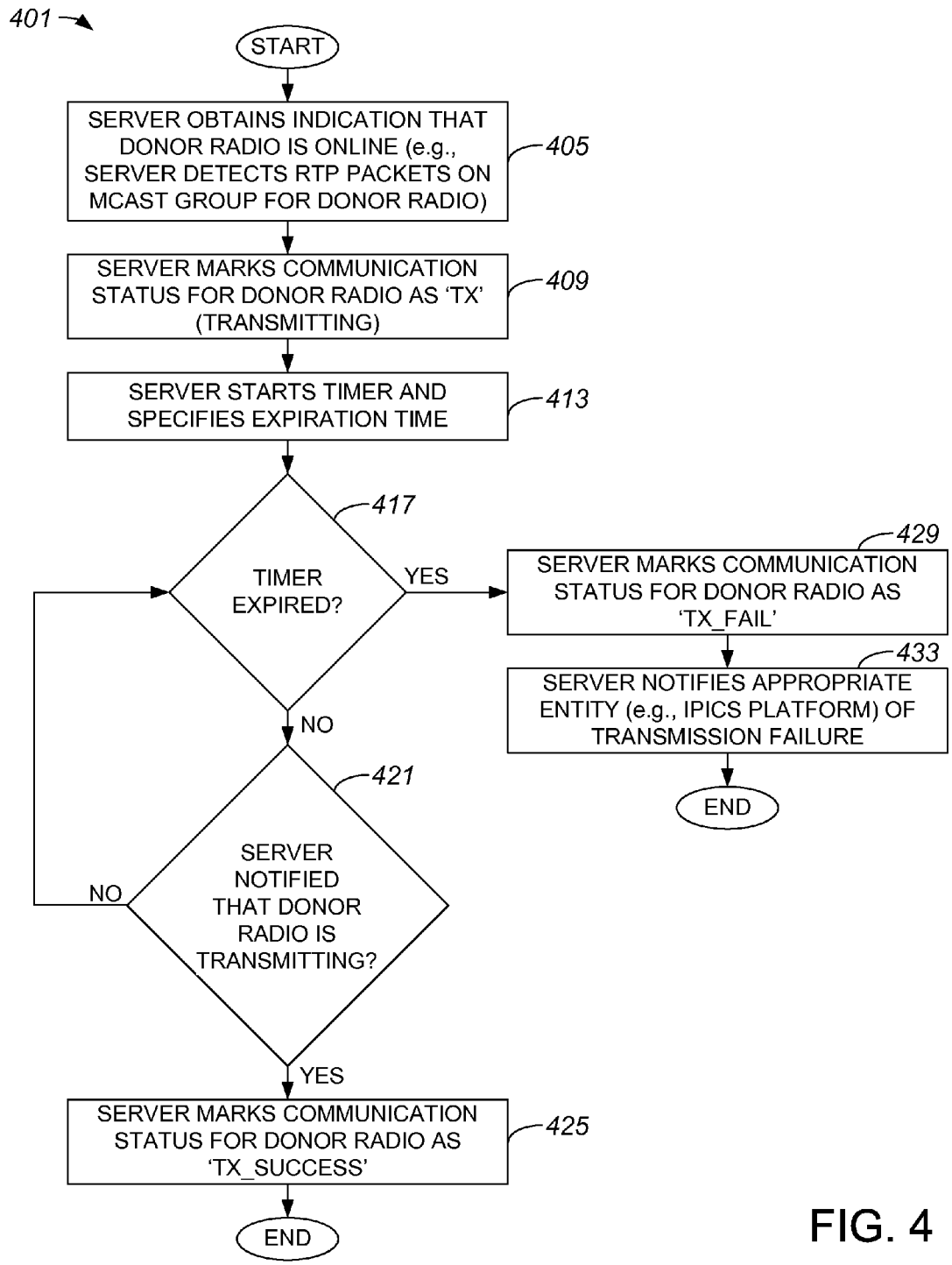
FIG. 4 is a process flow diagram which illustrates a process of determining a status of a donor radio with regards to whether the donor radio is successfully transmitting in accordance with an embodiment.

At times, a radio control server or, more generally, an IPICS system, may obtain an indication that a donor radio is transmitting, and will essentially endeavor to confirm whether the donor radio is actually transmitting. FIG. 4 is a process flow diagram which illustrates a process of determining a status of a donor radio with regards to whether the donor radio is successfully transmitting in accordance with an embodiment. A process 401 of determining a status of a donor radio begins at step 405 in which a server, e.g., a radio control server of an IPICS system, obtains an indication that a donor radio is online with respect to the server. In one embodiment, the indication may be the detection of RTP packets on a multicast group for the donor radio. That is, detecting RTP packets for a multicast group for a donor radio may indicate that the donor radio is online, e.g., transmitting.

In step 409, the server marks a communication status for the donor radio to indicate that the donor radio is transmitting. Upon marking the donor radio as transmitting, the server starts a timer in step 413 and specifies an expiration time. It should be appreciated that the expiration time may vary widely, and may depend upon factors including, but not limited to including, specifications associated with an overall IPICS system.

A determination is made in step 417 as to whether the timer has expired. If it is determined that the timer has not expired, it is determined in step 421 whether the server has been notified that the donor radio is transmitting. In general, if the donor radio is transmitting, the donor radio may notify the server over a control interface that the donor radio is transmitting and may transmit packets over a radio frequency, e.g., on a proprietary or standard wireless/wireline interface.

If the determination in step 421 is that the server has not been notified that the donor radio is transmitting, then process flow returns to step 417 in which it is determined whether the timer has expired. Alternatively, if the determination in step 421 is that the sever has been notified that the donor radio is transmitting, the indication is that the donor radio is actually online and successfully transmitting. Accordingly, the server marks the communication status for the donor radio as successfully transmitting in step 425, and the process of determining a status of a donor radio is completed.

Returning to step 417, if the determination is that the timer has expired, the indication is that the server is not online, e.g., is not successfully transmitting. As such, process flow moves to step 429 in which the server marks the communication status for the donor radio as a transmission failure. Once the server marks the communication status for the donor radio as a transmission failure, the server notifies an appropriate entity of the transmission failure in step 433. The appropriate entity may be, for example, an IPICS platform and/or an IPICS administrator. With the information regarding the transmission failure, an IPICS administrator may initiate a process of rectifying the transmission failure. Such a process of rectifying the transmission failure may include, but is not limited to including, searching for an alternate radio resource to communicate with in place of the donor radio. After the server notifies the appropriate entity of the transmission failure, the process of determining a status of a donor radio is completed.

Figure 5:
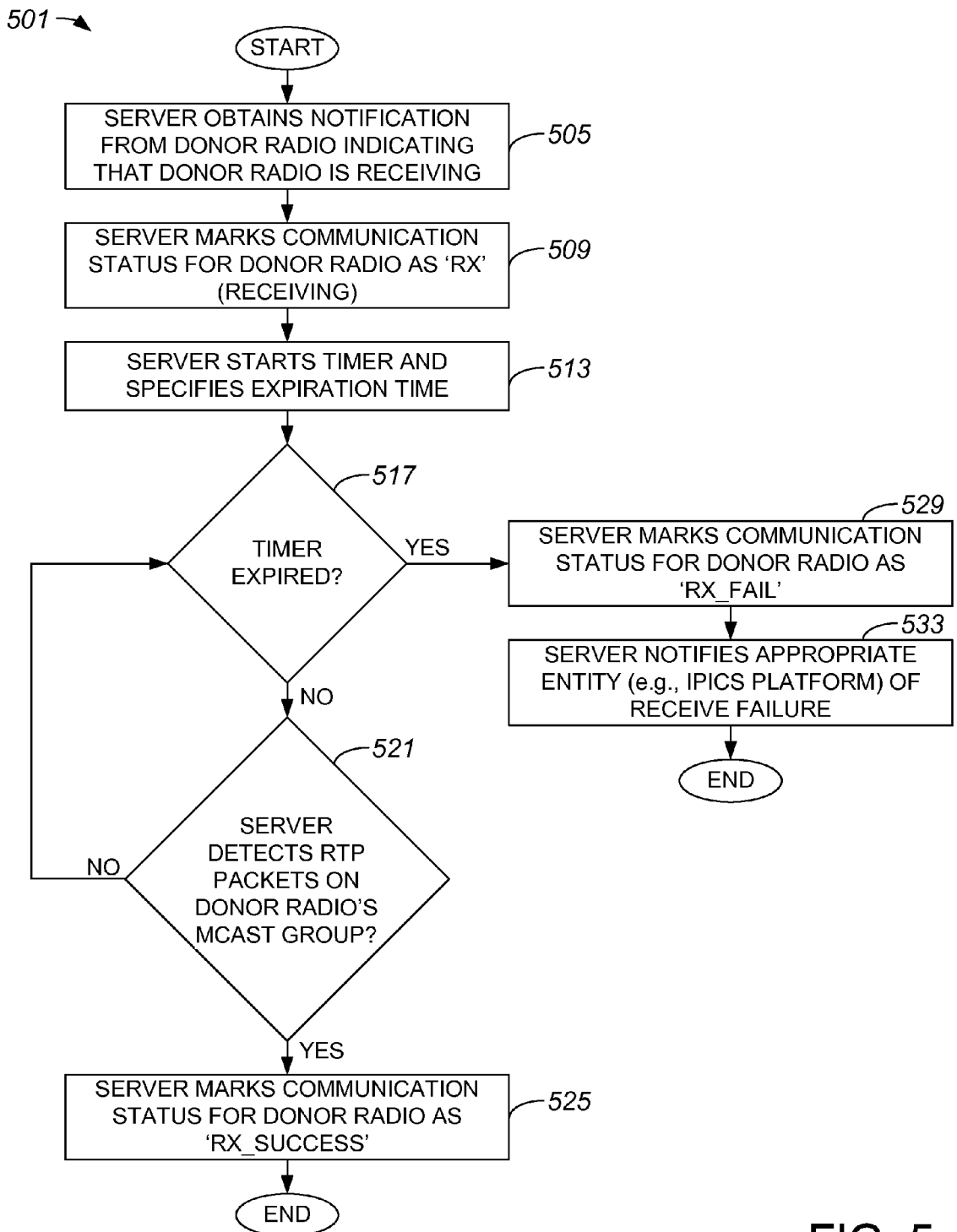
FIG. 5 is a process flow diagram which illustrates a process of determining a status of a donor radio with regards to whether the donor radio is successfully receiving in accordance with an embodiment.

When a radio control server or, more generally, an IPICS system, is notified by a donor radio that the donor radio is receiving, the radio control server may confirm that the donor radio is actually receiving. That is, the radio control server may essentially endeavor to confirm whether the donor radio is online as expected. With reference to FIG. 5, a process of determining a status of a donor radio with regards to whether the donor radio is successfully receiving in accordance with an embodiment. A process 501 of determining a status of a donor radio begins at step 505 in which a server, e.g., a radio control server of an IPICS system, obtains an indication that the donor radio is receiving. Such an indication may, in one embodiment, be a receive notification sent by the donor radio to the server.

After the server is notified that the donor radio is receiving, the sever marks the communication status for the donor radio as receiving in step 509. In step 513, the server starts a timer and specifies an expiration time for the timer. Once the timer is started, it is determined in step 517 whether the timer has expired. If it is determined that the timer is not expired, a determination is made in step 521 as to whether the server detects packets, e.g., RTP packets, on a multicast group of the donor radio. In one embodiment, the determination involves determining whether RTP packets that match an SSRC of the donor radio, e.g., an SSRC of an E&M port of the donor radio, are detected on the multicast group of the donor radio.

If the determination in step 521 is that the server has detected RTP packets on the multicast group of the donor radio, process flow proceeds to step 525 in which the server marks the communication status for the donor radio as successfully receiving. Upon marking the communication status for the donor radio as successfully receiving, the process of determining a status of a donor radio is completed. Alternatively, if it is determined in step 521 that the server has not detected RTP packets on the multicast group of the donor radio, then process flow returns to step 517 in which it is determined whether the timer has expired.

When the timer is determined not to be expired in step 517, then the implication is that no RTP packets have been detected on the multicast group of the donor radio. Accordingly, the server marks the communication status for the donor radio in step 529 as not successfully receiving, e.g., as a receive failure. After the communication status for the donor radio is marked, the server notifies an appropriate entity, e.g., an IPICS platform, that the donor radio is not successfully receiving in step 533. It should be appreciated that the appropriate entity may, upon learning that the donor radio is not successfully receiving, search for a different radio resource to communicate with in place of the donor radio. Such a search may be based, at least in part, upon a predefined policy that is associated with the appropriate entity. The process of determining a status of a donor radio is completed once the server notifies an appropriate entity that the donor radio is not successfully receiving.

Figure 6:
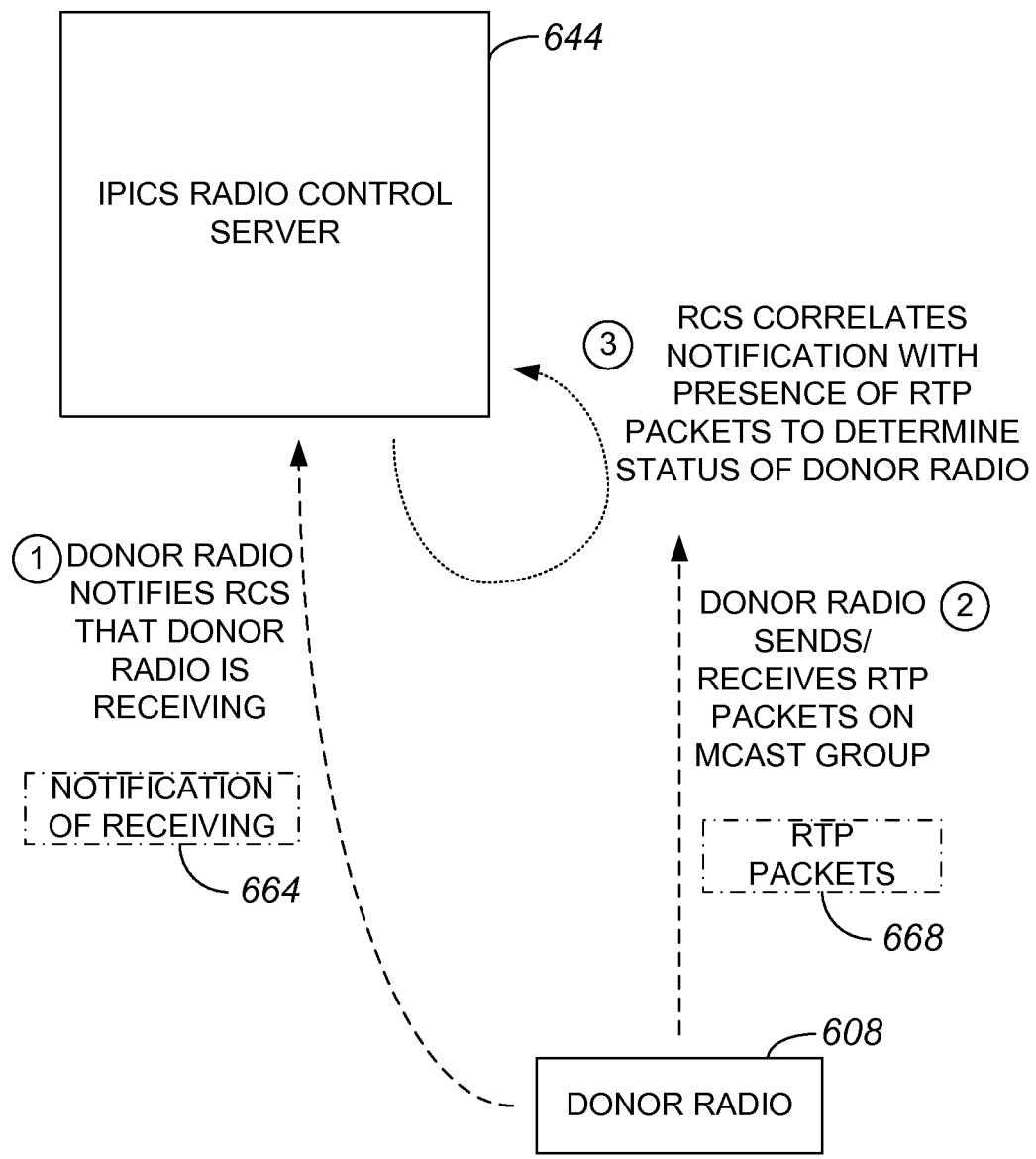
FIG. 6 is a diagrammatic representation of a process of determining a status of a donor radio using an IPICS radio control server in accordance with an embodiment.

FIG. 6 is a diagrammatic representation of a process of using an IPICS radio control server to determine a status of a donor radio in accordance with an embodiment. A donor radio 608 may send a notification 664 to an IPICS radio control server 644 that is arranged to indicate that donor radio 608 is receiving, e.g., is configured such that donor radio 608 is effectively online with respect to receiving or otherwise obtaining information from radio control server 644. Donor radio 608, after sending notification 664 to radio control server 644, then sends and/or receives RTP packet 668 on a multicast group. Radio control server 644 may generally monitor the multicast group, e.g., the multicast group associated with donor radio 608, to determine whether RTP packets 668 are sent and/or received on the multicast group. In general, radio control server 644 correlates notification 664 with the presence of RTP packets 668 on the multicast group. Correlating notification 664 with the presence of RTP packets 668 may result in a confirmation that donor radio 608 is receiving, or may result in a determination that donor radio 608 is not successfully receiving RTP packets 668.

Although only a few embodiments have been described in this disclosure, it should be understood that the disclosure may be embodied in many other specific forms without departing from the spirit or the scope of the present disclosure. By way of example, detecting offline donor radios, or donor radios that are not communicating with an IPICS system as expected, has been described as being facilitated by the IPICS system. An IPICS system, however, is not limited to detecting offline donor radios. In general, an IPICS system may identify when substantially any device associated with a donor system is expected to be transmitting to the IPICS system and/or receiving from the IPICS system, but is not. That is, the present disclosure is not limited to detecting offline donor radios.

While an interoperability system has generally been described as an IPICS system, it should be appreciated that an IPICS system is one example of an interoperability system. In general, the ability to detect an offline donor radio, or a donor radio that is not performing as expected, may be incorporated with respect to any suitable interoperability system. That is, an interoperability system is not limited to being an IPICS system.

The embodiments may be implemented as hardware and/or software logic embodied in a tangible medium that, when executed, is operable to perform the various methods and processes described above. That is, the logic may be embodied as physical arrangements or components. A tangible medium may be substantially any computer-readable medium that is capable of storing logic which may be executed, e.g., by a computing system, to perform methods and functions associated with the embodiments. Such computer-readable mediums may include, but are not limited to including, physical storage and/or memory devices. Executable logic may include code devices, computer program code, and/or executable computer commands or instructions.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
    obtaining an indication, the indication being arranged to indicate that a donor radio is online with respect to an interoperability system, the indication further being arranged to indicate that the donor radio is transmitting, wherein obtaining the indication includes detecting at least one real-time transport protocol (RTP) packet on a multicast group associated with the donor radio;
    determining if the indication is accurate, wherein determining if the indication is accurate includes determining if a notification is received from the donor radio, the notification being arranged to indicate that the donor radio is transmitting, and wherein determining if the indication is accurate further includes determining if the notification is received from the donor radio within a predetermined time period;
    identifying a communication status for the donor radio as a fail if it is determined that the indication is not accurate, the communication status being identified within the interoperability system; and
    identifying the communication status for the donor radio as a success if it is determined that the indication is accurate within the interoperability system.

2. The method of claim 1 wherein the indication is the notification, the notification being arranged to indicate that the donor radio is receiving.

3. The method of claim 2 wherein determining if the indication is accurate further includes determining if the at least one RTP packet is detected on the multicast group of the donor radio within the predetermined time period.

4. The method of claim 1 wherein the indication is obtained by a radio control server and the communication status of the donor radio is identified by the radio control server, the radio control server being included in the interoperability system.

5. A non-transitory computer-readable medium comprising computer program code, the computer program code, when executed, configured to:
    obtain an indication, the indication being arranged to indicate that a donor radio is online with respect to an interoperability system, the indication further being arranged to indicate that the donor radio is transmitting, wherein the computer program code configured to obtain the indication is configured to detect at least one real-time transport protocol (RTP) packet on a multicast group associated with the donor radio;
    determine if the indication is accurate, wherein the computer program code configured to determine if the indication is accurate is configured to determine if a notification is received from the donor radio, the notification being arranged to indicate that the donor radio is transmitting, and wherein the computer program code configured to determine if the indication is accurate is further configured to determine if the notification is received from the donor radio within a predetermined time period;
    identify a communication status for the donor radio as a fail if it is determined that the indication is not accurate, the communication status being identified within the interoperability system; and
    identify the communication status for the donor radio as a success if it is determined that the indication is accurate within the interoperability system.

6. The non-transitory computer-readable medium of claim 5 wherein the indication is the notification, the notification being arranged to indicate that the donor radio is receiving.

7. The non-transitory computer-readable medium of claim 6 wherein the computer program code configured to determine if the indication is accurate is further configured to determine if the at least one RTP packet is detected on the multicast group of the donor radio within the predetermined time period.

8. The non-transitory computer-readable medium of claim 5 wherein the indication is obtained by a radio control server and the communication status of the donor radio is identified by the radio control server, the radio control server being included in the interoperability system.

9. An apparatus comprising:
    means for obtaining an indication, the indication being arranged to indicate that a donor radio is online with respect to an interoperability system, the indication further being arranged to indicate that the donor radio is transmitting, wherein the means for obtaining the indication include means for detecting at least one real-time transport protocol (RTP) packet on a multicast group associated with the donor radio;
    means for determining if the indication is accurate, wherein the means for determining if the indication is accurate include means for determining if a notification is received from the donor radio, the notification being arranged to indicate that the donor radio is transmitting, and wherein the means for determining if the indication is accurate further include means for determining if the notification is received from the donor radio within a predetermined time period;
    means for identifying a communication status for the donor radio as a fail if it is determined that the indication is not accurate, the communication status being identified within the interoperability system; and
    means for identifying the communication status for the donor radio as a success if it is determined that the indication is accurate within the interoperability system.

10. An apparatus comprising:
    a communications arrangement, the communications arrangement being configured to communicate with a donor radio;
    a transmission issue sensing arrangement, the transmission issue sensing arrangement being configured to determine when the donor radio is expected to be online but is not online; and
    a packet monitoring and detection arrangement, the packet monitoring and detection arrangement being arranged to detect when a real-time transport protocol (RTP) packet is present on a multicast group associated with the donor radio by obtaining an indication, the indication being a notification received from the donor radio, the transmission issue sensing arrangement further being configured to determine if the indication is accurate, wherein the sensing arrangement is configured to determine if the indication is accurate by determining if the indication is if the indication is received from the donor radio within a predetermined time period.

11. The apparatus of claim 10 wherein the apparatus is a radio control server of an interoperability system.

12. The apparatus of claim 10 wherein the apparatus is included in an interoperability system, and wherein the transmission issue sensing arrangement is configured to determine when the donor radio is expected to be online with respect to the interoperability system but is not online with respect to the interoperability system.

* * * * *